United States Patent Office 2,793,235
Patented May 21, 1957

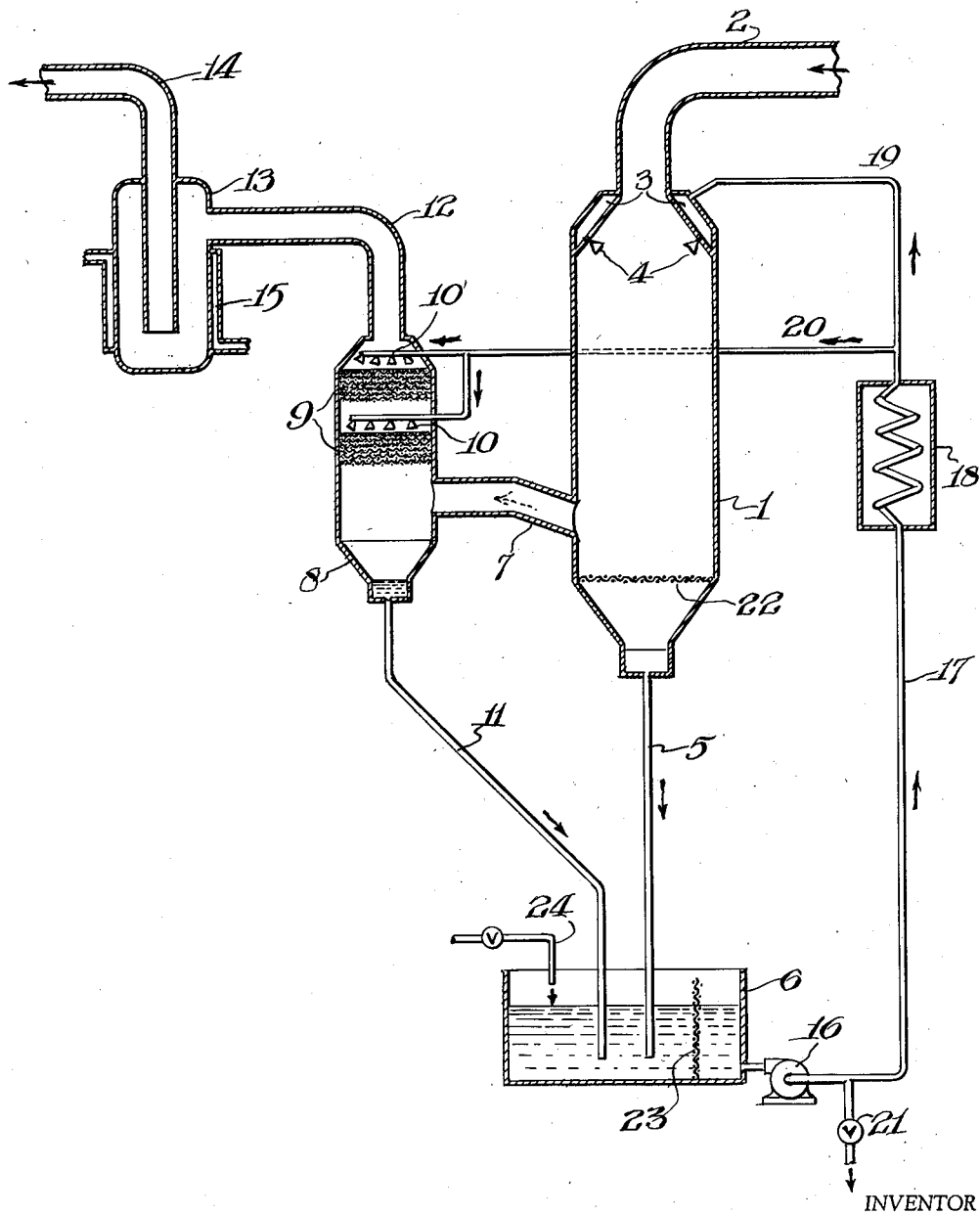

2,793,235

RECOVERY OF GLYCOLS FROM POLYESTER PRODUCTION

Hugh R. Jenkinson, Galena, Md., assignor to E. I. du Pont de Nemours and Company, Wilmington, Del., a corporation of Delaware Application September 27, 1954, Serial No. 458,371

17 Claims. (Cl. 260—637)

This invention relates to the recovery of ethylene glycol in the manufacture of polyesters such as polyethylene terephthalate, and more particularly to a recovery process for eliminating plugging of the condensing system used in the recovery by solids carried over with the glycol from the polymerization reaction.

A novel class of fiber- and film-forming polymers comprising polyesters of terephthalic acid and polymethylene glycols containing from 2 to 10 carbon atoms is disclosed in U. S. Patent 2,465,319 to Whinfield and Dickson. A commercially important example of this class is polyethylene terephthalate, which is prepared by carrying out an ester interchange reaction between ethylene glycol and dimethyl terephthalate followed by polymerization at elevated temperatures and reduced pressures. Although the final product contains only about one unit of the glycol for each unit of the acid, it is preferred to start with an amount of glycol in excess of a 1:1 molar ratio to obtain a smooth reaction leading to a product having the desired degree of polymerization. For example, when two or more moles of glycol are used for each mole of dimethyl terephthalate, the ester interchange reaction yields substantially monomeric bis(2-hydroxyethyl)terephthalate, which can then be polymerized smoothly into polyethylene terephthalate. From a commercial viewpoint, it is desirable to use a smaller amount of glycol, generally about 1.5–1.9 moles of glycol per mole of dimethyl terephthalate; in this instance, the product of the ester exchange reaction contains dimeric esters and other higher esters as well as the monomeric ester.

During the polymerization reaction, it is necessary to remove the excess glycol, and since it represents from 30% to 50% or even more of the original amount of glycol, it is economically desirable to recover the glycol for further use. The glycol is taken off in vapor form and suitably condensed and recovered; preferably, the cooled glycol is recirculated and sprayed into the glycol vapor to effect condensation of the vapor. Unfortunately, the spray nozzles and other parts of such a system tend to become plugged within a short time by deposits of hard, crystalline material. This material apparently is made up of glycol-insoluble polymeric esters of terephthalic acid which are entrained by the glycol vapor. Because an efficient condensing system is needed to maintain low pressure in the polymerization vessel, the rapid plugging of the system interferes with smooth operation of the process.

It is an object of this invention to provide an improved process for recovering ethylene glycol. Another object is to provide such a process in which plugging of the recovery system is avoided. These and other objects will be more clearly delineated in the following description and claims.

The foregoing objects are accomplished by the addition of an alkali, such as sodium hydroxide, to the glycol/ester mixture. Usually this is done by adding the alkali to the recirculating glycol. Surprisingly, it has been found that esters and polyesters are saponified rapidly in the essentially anhydrous medium by maintaining a slight excess of alkali over the theoretical requirements of the ester, such as the terephthalate. Precipitation or crystallization of the terephthalate polyesters is thereby avoided, both in the recovery system and in the subsequent purification steps. A further advantage is afforded by the easy separation of alkali terephthalate salts upon flashing off the glycol during purification, making possible the recovery of terephthalic acid which may be purified for further use. The process of this invention thus comprises converting a glycol vapor containing esters into a substantially ester-free glycol in liquid form by condensing the ester laden vapor and saponifying the esters in the presence of a substantially anhydrous alkaline material. The process is normally a continuous one. Fresh alkaline matter is added continuously and the resultant new saponifying medium is piped back into the condenser, preferably at the top to assist in condensing. It is recognized, of course, that some saponification may be occurring during this transfer, but in the main the saponification occurs chiefly in the condenser and in the hot well. Liquid is removed periodically or on a continuous basis for separation of glycol and the resultant acid salts.

By way of example, the invention is illustrated in the accompanying drawing, which is a schematic outline, or flow sheet, showing an arrangement of devices in which the process of the present invention may be realized.

Referring now to the figure, glycol/ester vapor from a polymerization reaction vessel (not shown) is introduced into spray condenser 1 through inlet pipe 2. Recirculating glycol is supplied from manifold 3 to spray nozzles 4, thus effecting condensation of the hot vapor. Usually, four or more spray nozzles will be used. The condensed glycol collects at the bottom of the spray condenser and flows through pipe 5 into hot well 6, in which the recirculating glycol is stored. Pipe 5 should be of sufficient height to maintain a barometric leg between the hot well, at atmospheric pressure, and the spray condenser, under reduced pressure. Noncondensable gases, together with residual glycol in the form of fog or mist, are passed from the spray condenser through pipe 7 into mist eliminator 8. In this vessel, the vapor flows upward through fine wire mesh 9 wetted by a fine spray of recirculated glycol from spray nozzles 10, the glycol returning to the hot well through pipe 11, which is maintained as a barometric leg. The remaining vapor, which is substantially free of glycol and other condensables, passes through pipe 12, cold trap 13, and pipe 14 to a vacuum source (not shown). The cold trap is cooled by passing cold water through jacket 15. An additional cold trap cooled with Dry Ice may also be employed, especially where pressures of less than 10 mm. of mercury are required.

The hot well 6 is maintained at temperatures up to 70° C. to facilitate the saponification reaction of the ester and polyester materials. Glycol is removed from the hot well for recirculation by pump 16 and passed through pipe 17 to cooler 18, in which the temperature of the glycol is reduced to about 45° C., or to as low as 20° C. if very low pressures (ca. 1 mm.) are required in the vacuum system. The recirculating glycol is forwarded to manifold 3 of the spray condenser by pipe 19, while the spray nozzles 10 of the mist eliminator are supplied by pipe 20. Glycol is withdrawn from the recirculating system at valve 21. The valve may be controlled by appropriate means to withdraw glycol continuously so long as the glycol in the hot well is maintained at a given level.

The composition of the incoming glycol vapor varies, depending upon the degree of polymerization of the reaction mixture from which the glycol is being obtained, the operating conditions, and the particular design of the reaction vessel. In general, however, the glycol vapor will contain, in the manufacture of terephthalates, from 1.5 to 3.5% by weight of terephthalate esters and polyesters. Of this material it is generally found that up to 0.08%, based on the total weight of the glycol vapor, is insoluble in glycol. In order to minimize deposition of these substances in the inlet pipe 2, the pipe is preferably heated along its entire length to the entrance of the spray condenser; usually the incoming vapor will be maintained at a temperature of about 265°–300° C. Lumps of deposited polyester which may occasionally fall from the inlet pipe are caught by screen 22. Owing to the hard, crystalline nature of this material, it dissolves only relatively slowly in the alkaline glycol. A fine-mesh screen 23 serves to protect the pump from smaller pieces of this material which may have washed down from the spray condenser.

Caustic is added by suitable means 24 to the hot well at a rate sufficient to maintain the recirculating glycol at a substantially uniform level of alkalinity. For example, solid caustic or a concentrated aqueous solution of the caustic may be added continuously at a controlled rate. It is necessary to maintain a concentration of at least 0.015 mole of free alkali per liter of glycol solution (0.054 weight percent in the case of sodium hydroxide) to prevent precipitation or crystallization of the terephthalic polyesters from the glycol. Preferably, the concentration of free alkali is maintained in the range 0.05–0.12 mole per liter of solution. Under these conditions, rapid saponification of the terephthalic polyesters will occur, with the result that most of the terephthalate in the recirculating glycol solution exists in the form of alkali terephthalates. For example, when the incoming glycol vapor contains about 2% esters and polyesters by weight, the recirculating glycol will contain up to about 0.23 mole per liter of combined alkali in addition to the free alkali. Concentrations of free alkali in excess of about 0.15 mole per liter of solution should be avoided, especially at times when the concentration of alkali terephthalate is high, since excessive free alkali may precipitate alkali terephthalate from solution. When this occurs, it is possible to redissolve the alkali terephthalates by adding water to the recirculating glycol. However, the addition of water to the system creates an additional load on the vacuum system owing to evaporation of the water in the spray condenser; hence, it is usually desirable to avoid this problem by controlling the concentration of free alkali. The concentration of the alkali terephthalate in the glycol reaches a substantially constant level. The amount of glycol in the system is controlled by balancing the rate of withdrawal with the rate of condensation. The withdrawn glycol contains alkali terephthalate in solution together with free alkali and perhaps a low concentration of unsaponified esters still undergoing reaction. The terephthalate may be recovered later by flashing off the glycol as the first step in glycol purification.

The degradation of glycol-insoluble terephthalate polyesters to the lower glycol-soluble esters and ultimately to alkali terephthalate occurs very rapidly, and precipitation of the polyesters from the glycol does not occur even when the volume of the system is small as compared with the rate of recovery of glycol from the system. Surprisingly, the presence of water is not necessary for rapid saponification. In fact, it is preferred to add the alkali in anhydrous form, or in concentrated aqueous solution. Maintenance of the system in anhydrous condition or at low levels of water concentration (0 to about 3%) aids control of vacuum and facilitates purification of the glycol. The alkaline material that is used is usually sodium hydroxide. Other hydroxides, such as potassium, cesium and rubidium hydroxides as well as the carbonates of these metals may be used. The compound used should be highly alkaline, non-volatile and soluble in substantially anhydrous ethylene glycol; of course, the salts of the terephthalic acid produced by these alkaline materials should be soluble in the glycol, and this normally occurs. Of such materials, sodium hydroxide and sodium carbonate are preferred.

The ester/glycol vapor which is being treated may vary considerably in its chemical make-up, for in the production of polyesters different glycols and acids may be used. In addition to ethylene glycol there may be present propanediol-1,3, butanediol-1,4, polytetramethylene glycol, polyethylene glycols, polydecamethylene glycol and polydioxolane. Similarly, the acid residues may contain other than terephthalates. For example, bibenzoic, isophthalic, or ethylene-bis-p-oxybenzoic acids may be used in the polymer preparation. The amount of such hydroxy and acid residues in the glycol vapor will depend on the amounts used, the volatilities of the compounds and ester intermediates and extent of polymerization. Normally, ethylene glycol and terephthalate residues are the main constituents of the vapor.

The process of this invention is not restricted to the particular apparatus described hitherto. Any suitable condensing system may be used in which the recirculated alkaline glycol is used as a condensing medium. For example, the mist eliminator may be incorporated with the spray condenser as a single unit, especially where very low pressures are not required. The condensing system may be utilized in a batch polymerization process or in a continuous polymerization process.

Any departure from the above description which conforms to the present invention is intended to be included within the scope of the claims.

I claim:

1. In the process for the conversion of a glycol vapor containing esters to a substantially ester-free glycol in liquid form the improvement which comprises the step of condensing the said vapor and saponifying the said esters in the presence of a substantially anhydrous alkaline material.

2. A process in accordance with claim 1 which is a continuous process.

3. A process in accordance with claim 1 wherein said alkaline material is sodium hydroxide.

4. A process in accordance with claim 1 wherein said alkaline material is sodium carbonate.

5. A process in accordance with claim 1 wherein said glycol is ethylene glycol.

6. A process in accordance with claim 1 wherein said saponification is carried out in the presence of no more than about 3% water.

7. A process in accordance with claim 1 wherein said alkaline material is present in the amount of at least about 0.015 mole per liter but less than about 0.15 mol per liter of the condensed glycol.

8. A process in accordance with claim 1 wherein said ester is a terephthalate.

9. A process in accordance with claim 1 in which the condensing is conducted under reduced pressure.

10. A process for the conversion of a glycol vapor containing esters to a substantially ester-free glycol in liquid form which comprises condensing the said vapor; saponifying the said esters in the presence of a substantially anhydrous alkaline material; removing a portion of the resultant saponified mixture; replacing the removed portion by ester-containing glycol being condensed and unsaponified; and continuing the said saponification.

11. A process in accordance with claim 10 wherein additional substantially anhydrous alkaline material is added to the said removed portion of the resultant saponified mixture and wherein a portion of the resultant formed mixture is added to the said ester-containing glycol being condensed.

12. A process in accordance with claim 10 wherein a portion of the said removed resultant saponified mixture is not recycled but is continuously withdrawn and said glycol is removed therefrom by distillation.

13. A process in accordance with claim 10 in which the condensing is conducted under reduced pressure.

14. A process for the conversion of a glycol vapor containing esters to a substantially ester-free glycol in liquid form which comprises condensing said vapor and collecting the resultant condensate in a vessel; saponifying the said esters in the presence of a substantially anhydrous alkaline material and in the presence of no more than about 3% water; removing a portion of the resultant saponified mixture from the said vessel; adding to this mixture fresh, substantially anhydrous alkaline material to form a saponifying medium; and returning this medium to said vessel while simultaneously passing into said vessel ester-containing glycol for condensation and saponification.

15. A process in accordance with claim 14 in which the condensing is conducted under reduced pressure.

16. In the process of manufacturing polymeric esters from a terephthalate ester and an excess of glycol in which glycol is removed from the zone of the polymerization reaction and condensed and wherein the said removed glycol contains from about 1.5 percent to 3.5 percent by weight of a mixture of neutral terephthalate esters and polyesters which tend to clog the orifices of the condensing apparatus used to liquefy the glycol, the improvement of reducing a clogging of the said orifices by rendering the said esters soluble in the glycol which comprises the step of saponifying the esters by adding thereto from 0.15 to 0.015 mol per liter of glycol of an alkaline material.

17. The process of claim 16 in which the alkaline material is selected from the group consisting of the hydroxides and carbonates of the alkali metals.

References Cited in the file of this patent

UNITED STATES PATENTS 2,508,911   Garner et al. _____ May 23, 1950